3,235,327
MANUFACTURE OF URANIUM DIOXIDE

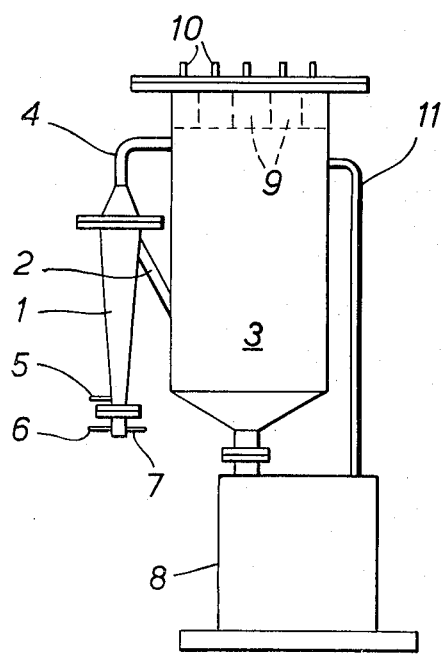

Anthony Blundell and Lionel Hepworth Brooks, Preston, John Colin Clarke, Hartford, near Northwich, and George Marshall Gillies and Christopher John Saum, Lytham St. Anne's, England, assignors to United Kingdom Atomic Energy Authority, London, England
Filed Jan. 19, 1962, Ser. No. 167,265
Claims priority, application Great Britain, Jan. 23, 1961, 2,683/61
9 Claims. (Cl. 23—14.5)

This invention relates to the manufacture of uranium dioxide.

The use of uranium dioxide as a fuel for nuclear reactors is currently receiving much attention. It is generally accepted that, in it fabricated form, uranium dioxide should have the highest possible density, a degree of enrichment in the U235 isotope, and low level fluoride impurity.

As enrichment of uranium customarily takes place through the medium of the compound uranium hexafluoride, a process is required for converting uranium hexafluoride into uranium dioxide in a form which can be readily fabricated to very dense bodies of low fluoride content.

One method of converting uranium hexafluoride to uranium dioxide involves hydrolysis of uranium hexafluoride to give a solution of uranyl flouride and hydrogen fluoride from which ammonium di-uranate is precipitated by the addition of ammonia. After filtration the ammonium di-uranate, which has a high fluoride ion content, is dissolved in nitric acid and fluoride decontamination of the resulting uranyl nitrate solution is carried out by solvent extraction. From the resulting purified uranyl nitrate solution ammonium di-uranate is re-precipitated and then calcined to give $U_3O_8$ which is reduced with hydrogen to give uranium dioxide.

The present invention provides a more direct route for the manufacture of uranium dioxide from uranium hexafluoride.

According to the present invention a method of manufacturing uranium dioxide comprises converting uranium hexafluoride to uranyl fluoride using steam at a temperature of at least 130° C. in the presence of a gas inert to this conversion, the uranyl fluoride being produced in powder form having a surface area in the range of 3 to 12 metres$^2$/gm., and subsequently converting the uranyl fluoride to uranium dioxide using hydrogen and steam at a temperature of 550 to 600° C. and at a hydrogen to steam volume ratio of at least two to one.

The surface area is determined by the known method of measuring the volume of inert gas (e.g. nitrogen) adsorbed at a given temperature.

By way of example, the invention will now be described with reference to the accompanying drawings in which the single figure is a line diagram.

The drawings show a tapered heated reaction vessel 1 of circular cross-section having a side-arm 2 connected to a collector vessel 3 and an upper outlet pipe 4 also connected to the vessel 3. The vessel 1 has inlet pipes 5, 6, 7 and the vessel 3 is connected to a storage vessel 8. The vessel 3 has a series of blow-back filters 9 each having an outlet pipe 10. A pipe 11 connects between the vessel 3 and the vessel 8.

In use uranium hexafluoride is admitted into the reaction vessel 1 (which contains an initial bed of $UO_2F_2$) through the inlet pipe 5 and steam and nitrogen are admitted at atmospheric pressure into the vessel through the inlet pipes 6, 7 respectively. The uranium hexafluoride is converted into uranyl fluoride in the form of a light fluffy powder in a fluidised bed system established in the vessel 1 by the steam and nitrogen. The vessel 1 is dimensioned (i.e. tapered) so that vigorous powder agitation is achieved in the region of the pipes 5, 6, 7 to prevent blockage of the inlet pipe 5 and gentle powder agitation at the surface of the fluidised bed so as to limit the amount of powder entrained in the exit gas. The product powder passes to the vessel 3 through the side-arm 2 and thence to the vessel 8. The exit gas which contains hydrogen fluoride passes to the filters 9 via the pipe 4 and then through the pipes 10 to a trap where the hydrogen fluoride is retained. Any fine powder collecting in the filters 9 is returned to the vessel 3 and thence to the vessel 8 by periodically isolating each of the filters 9 in turn and blowing back the isolated filter 9 with nitrogen. Gas in the vessel 8 displaced by the powder passes to the vessel 3 through the pipe 11.

For a base diameter of three inches, top diameter of seven inches and length of eighteen inches, typical operating figures for the vessel 1 are as follows:

Flow rate of uranium hexafluoride _____ 0.5 g. mole/min.
Inlet temperature of uranium hexafluoride _____ 120 C.
Flow rate of steam _____ 22 litres/min. (corrected to STP).
Inlet temperature of steam _____
Inlet temperature of nitrogen ____ 140° C.
Flow rate of nitrogen _____ 140° C.
Throughput of uranium hexafluoride _____ 66 litres/min. (STP).
                                 10.6 kgm./hr.
Output of uranyl fluoride _____ 9.2 kgm./hr.
Surface area of uranyl fluoride ___ 5 metres$^2$/gm.

The reaction temperature is maintained by external heating of the vessel 1.

The importance of the presence of a gas inert to the conversion (nitrogen in the example quoted above) is illustrated by the following experimental results.

Trial conversions of uranium hexafluoride to uranyl fluoride using 5 to 20% excess steam only (no nitrogen) in the temperature range 150 to 500° C. gave a heavy uranyl fluoride powder having a tap density of 3 gm./cc. and a surface area of 0.5 metre$^2$/gm.

By way of contrast, converisons of uranium hexafluoride to uranyl fluoride using 5 to 20% excess steam in the presence of nitrogen (with a nitrogen flow rate six times that of the uranium hexafluoride), and in the temperature range 130 to 300° C., gave a light fluffy uranyl fluoride powder having a tap density in the range 1.0 to 1.5 gm./cc. and a surface area in the range 5 to 8 metres$^2$/gm.

Whilst the mechanism of the conversion is not fully understood at the present time, it is believed that the presence of a gas inert to the conversion (for example nitrogen) tends to promote a gas phase reaction between the uranium hexafluoride and the steam thereby giving the desired result of a light uranyl fluoride powder of high surface area.

From the vessel 8 the uranyl fluoride is transferred to a heated gas-solid contacting apparatus (i.e. fluidised bed or moving bed) in which the uranyl fluoride is converted to uranium dioxide using hydrogen and steam. Typical operating figures for a 2" diameter fluidised bed reaction vessel are as follows:

| | |
|---|---|
| Flow rate of uranyl fluoride | 0.2 g. mole/min. |
| Inlet temperature of uranyl fluoride | 15° C. |
| Flow rate of steam | 15.4 litres/min. (corrected to STP). |
| Inlet temperature of steam | 600° C. |
| Flow rate of hydrogen | 30.8 litres/min. (corrected to STP). |
| Inlet temperature of hydrogen | 600° C. |
| Throughput of uranyl fluoride | 3.6 kgm./hr. |
| Output of uranium dioxide | 3.3 kgm./hr. |

The reaction temperature is maintained by external heating of the reaction vessel, and the hydrogen and steam are introduced at atmospheric pressure.

Use of hydrogen and steam has been found to give faster conversion rates than when using hydrogen alone, a hydrogen to steam volume ratio of two to one being preferred.

The uranium dioxide produced has been fabricated to give sintered bodies of high density (10.5 gm./cc. or higher) without the need for ball-milling or cyclone treating the uranium dioxide prior to sintering.

The fluoride ion content of the uranium dioxide powder produced is below 200 p.p.m. and of the sintered bodies is below 20 p.p.m., and the chemical composition of the uranium dioxide produced is in the range $UO_{2.00\ to\ 2.02}$.

We claim:

1. A method of manufacturing uranium dioxide comprising converting uranium hexafluoride to uranyl fluoride using steam at a temperature of at least 130° C. in the presence of a continuous flow of a gas inert to this conversion, the uranyl fluoride being produced in powder form having a surface area in the range of 3 to 12 meters$^2$/gm., and subsequently converting the uranyl fluoride to uranium dioxide using hydrogen and steam at a temperature of 550 to 600° C. and at a hydrogen to steam volume ratio of at least two to one.

2. A method of manufacturing uranium dioxide as claimed in claim 1, wherein the flow ratio of inert gas to uranium hexafluoride used in the conversion of the uranium hexafluoride to uranyl fluoride is six to one.

3. A method of manufacturing uranium dioxide as claimed in claim 1, wherein the hydrogen to steam volume ratio used in the conversion of the uranyl fluoride to uranium dioxide is two to one.

4. A continuous process for the production of uranium dioxide powder which process comprises reacting uranium hexafluoride and steam to form uranyl fluoride in powder form in the presence of a continuous flow of a gas which is inert to the reaction, said uranyl fluoride being subsequently treated with hydrogen and steam at a sufficient temperature for conversion of the fluoride to uranium dioxide.

5. A method of manufacturing uranium dioxide as claimed in claim 2, wherein the hydrogen to steam volume ratio used in the conversion of the uranyl fluoride to uranium dioxide is two to one.

6. A method of manufacturing uranium dioxide comprising conversion of uranium hexafluoride to uranyl fluoride in a fluidized bed using steam at a temperature of at least 130° C. in the presence of a gas inert to said conversion, said uranyl fluoride being produced in powder form having a surface area in the range of 3 to 12 meters$^2$/gm., and subsequent conversion of said uranyl fluoride to uranium dioxide using hydrogen and steam at a temperature of 550 to 600° C. and at a hydrogen to steam volume ratio of at least two to one.

7. A method of manufacturing uranium dioxide comprising conversion of uranium hexafluoride to uranyl fluoride in a fluidized bed using steam at a temperature of at least 130° C. in the presence of a gas inert to said conversion, the flow ratio of inert gas to uranium hexafluoride being six to one, said uranyl fluoride being produced in powder form having a surface area in the range of 3 to 12 meters$^2$/gm., and subsequent conversion of said uranyl fluoride to uranium dioxide using hydrogen and steam at a temperature of 550 to 600° C. and at a hydrogen to steam volume ratio of at least two to one.

8. A method of manufacturing uranium dioxide comprising converison of uranium hexafluoride to uranyl fluoride in a fluidized bed using steam at a temperature of at least 130° C. in the presence of a gas inert to said conversion, said uranyl fluoride being produced in powder form having a surface area in the range of 3 to 12 meters$^2$/gm., and subsequent conversion of said uranyl fluoride to uranium dioxide using hydrogen and steam at a temperature of 550 to 600° C. and at a hydrogen to steam volume ratio of two to one.

9. A method of manufacturing uranium dioxide comprising conversion of uranium hexafluoride to uranyl fluoride in a fluidized bed using steam at a temperature of at least 130° C. in the presence of a gas inert to said conversion, the flow ratio of inert gas to uranium hexafluoride being six to one, said uranyl fluoride being produced in powder form having a surface area in the range of 3 to 12 meters$^2$/gm., and subsequent conversion of said uranyl fluoride to uranium dioxide using hydrogen and steam at a temperature of 550 to 600° C. and at a hydrogen to steam volume ratio of two to one.

References Cited by the Examiner

UNITED STATES PATENTS

| | | | |
|---|---|---|---|
| 2,659,655 | 11/1953 | Sweet | 23—14.5 |
| 2,906,598 | 9/1959 | Googin | 23—14.5 |
| 3,009,768 | 11/1961 | Adams et al. | 23—14.5 |

FOREIGN PATENTS

| | | |
|---|---|---|
| 800,692 | 9/1958 | Great Britain. |
| 855,217 | 11/1960 | Great Britain. |

OTHER REFERENCES

Katz, "Chemistry of Uranium," pp. 440, 566, 570, 572 (1951).

TID–7518 (Pt. 1), pages 1–10, September 1956.

ORNL–2690, pp. 4–7, 9, 14, July 9, 1959.

Nuclear Science Abstracts, vol. 10, Abstract 6242 (1956).

AEC Document ANL 6023, pp. 3–7, 10, 11, August 1959.

AEC Document ANL 6101, pp. 125–127, Quarterly Report, October–December 1959.

AEC Document ANL 6145, pp. 124–128, Quarterly Report, January–March, 1960.

AEC Document ANL 6183, pp. 118–122, Quarterly Report, April–June, 1960.

REUBEN EPSTEIN, *Primary Examiner.*

CARL D. QUARFORTH, ROGER L. CAMPBELL, *Examiners.*